US012791128B2

(12) United States Patent
Chen et al.

(10) Patent No.: US 12,791,128 B2
(45) Date of Patent: Nov. 10, 2026

(54) PIPE, PIPE CONNECTION AND PIPELINE SYSTEM

(71) Applicant: CORE LINEPIPE INC., Calgary (CA)

(72) Inventors: Wei-en Chen, Calgary (CA); Gregory Michael Henry, Calgary (CA)

(73) Assignee: CORE LINEPIPE INC., Calgary (CA)

( * ) Notice: Subject to any disclaimer, the term of this patent is extended or adjusted under 35 U.S.C. 154(b) by 0 days.

(21) Appl. No.: 19/408,033

(22) Filed: Dec. 3, 2025

(65) Prior Publication Data

US 2026/0160362 A1 Jun. 11, 2026

Related U.S. Application Data

(60) Provisional application No. 63/728,519, filed on Dec. 5, 2024.

(51) Int. Cl.
*F16L 19/04* (2006.01)
*F16L 21/00* (2006.01)
*F16L 47/03* (2006.01)

(52) U.S. Cl.
CPC ........... *F16L 21/002* (2013.01); *F16L 21/007* (2013.01)

(58) Field of Classification Search
CPC ..... F16L 13/141; F16L 13/142; F16L 13/143; F16L 13/146; F16L 13/147; F16L 58/181; F16L 58/185; F16L 47/03
See application file for complete search history.

(56) References Cited

U.S. PATENT DOCUMENTS

| | | | | |
|---|---|---|---|---|
| 9,857,003 B2 * | 1/2018 | Bouey | B29C 66/1224 |
| 10,487,965 B2 * | 11/2019 | Bouey | F16L 47/03 |
| 10,544,889 B2 | 1/2020 | Bouey et al. | |
| 10,632,518 B2 * | 4/2020 | Bouey | F16L 19/028 |
| 2015/0027581 A1 * | 1/2015 | Bouey | B29C 65/3468 285/21.2 |
| 2016/0116080 A1 * | 4/2016 | Bouey | F16L 15/006 29/428 |
| 2017/0129001 A1 * | 5/2017 | Bouey | F16L 13/146 |
| 2026/0146691 A1 * | 5/2026 | Chen | F16L 21/022 |
| 2026/0160362 A1 * | 6/2026 | Chen | F16L 21/002 |

* cited by examiner

*Primary Examiner* — Aaron M Dunwoody
(74) *Attorney, Agent, or Firm* — James R. Gourley; Carstens, Allen & Gourley, LLP

(57) ABSTRACT

A pipe for a pipe to pipe connection includes a first belled end; a second belled end; a middle portion between the first belled end and the second belled end, the middle portion having an outer diameter, wherein the first belled end has a first enlarged outer diameter greater than the outer diameter of the middle portion; and wherein the second belled end includes a stepped outer diameter, wherein the belled end has an enlarged outer diameter greater than the middle portion and then steps up to a further enlarged outer diameter.

14 Claims, 6 Drawing Sheets

PIPE, PIPE CONNECTION AND PIPELINE SYSTEM

CROSS REFERENCE TO RELATED APPLICATION

This application claims the benefit of U.S. provisional Application No. 63/728,519 entitled "Pipe, Pipe Connection and Pipeline System" filed Dec. 5, 2024, the technical disclosure of which is incorporated herein by reference in its entirety.

FIELD OF THE INVENTION

The present invention relates to a pipeline system for conveying fluids and, in particular, to a pipe, a pipe connection assembly, equipment and methods.

BACKGROUND OF THE INVENTION

Pipelines are needed for conveying fluids such as water, oil effluent, natural gas, carbon dioxide or mining slurries some of which may be pressurized.

Thin walled metal pipes offer an advantage in terms of facilitated handling and reduced material costs. However, thin walled pipes have proven difficult to connect in a reliable and efficient manner.

Applicant introduced a pipeline system and method that has proven excellent for connection of pipes, as described in U.S. Pat. Nos. 9,857,003 and 10,544,889.

Continued research has led to improvements even to applicant's current technology.

SUMMARY OF THE INVENTION

A pipeline system is provided for conveying fluids, including a pipe, a pipe connection assembly, a pipe connection and a method.

In accordance with one aspect of the present invention, there is provided a pipe for a pipe connection assembly comprising: a first open end; a second open end; an inner surface defining an inner diameter; an outer surface; a wall thickness defined by the distance between the inner surface and the outer surface; a first belled end adjacent the first open end; a second belled end adjacent the second open end; a middle portion between the first belled end and the second belled end, the middle portion having an outer diameter; wherein the first belled end has a first enlarged outer diameter greater than the outer diameter of the middle portion; and wherein the second belled end includes (i) a second enlarged outer diameter adjacent the middle portion and where the second enlarged outer diameter is greater than the outer diameter of the middle portion and (ii) a third enlarged outer diameter between the second enlarged outer diameter and the open end, where the third enlarged outer diameter is greater than the second enlarged outer diameter; a first press ring encircling the middle portion adjacent the first belled end, the first press ring having an inside diameter larger than the outer diameter and smaller than the first enlarged outer diameter; and a second press ring encircling the middle portion between the first press ring and the second belled end, the second press ring having an inside diameter larger than the second enlarged outer diameter and smaller than the third enlarged outer diameter.

In accordance with another aspect of the present invention, there is provided a pipe connection assembly comprising: the above-summarized pipe; a mandrel for mechanically engaging the pipe to another pipe, the mandrel formed as a cylindrical tube and being sized to be positioned within the second belled end and the pipe mandrel including outwardly extending teeth; and, the second press ring being configured to be installed encircling the pipe at the third enlarged outer diameter and radially outwardly of the mandrel and to deform and hold the pipe radially inwardly into engagement with the teeth.

In accordance with another aspect of the present invention, there is provided a method for making up a pipe connection using the pipe connection assembly as summarized above and, the method comprising: inserting the mandrel into the second open end to a position with a first end of the mandrel being within the third enlarged outer diameter and a second end of the mandrel protruding from the second open end; moving the second press ring from the position encircling the middle portion to a position encircling third enlarged outer diameter, to thereby deform the second belled end radially inwardly into mechanical engagement with the teeth on the mandrel; leaving the second press ring in place encircling the second belled end to hold the pipe in mechanical engagement with the mandrel; and installing a second pipe on the second end of the mandrel.

In accordance with another aspect of the present invention, there is provided a pipe connection comprising: a first and a second pipe as summarized above; and a mandrel mechanically engaging the first pipe to the second pipe, wherein the first belled end of the first pipe is engaged to the mandrel and the second belled end of the second pipe is engaged to the mandrel.

BRIEF DESCRIPTION OF THE FIGURES

Referring to the figures wherein like reference numerals indicate similar parts throughout the several views, several aspects of the present invention are illustrated by way of example, and not by way of limitation, in detail in the figures, wherein:

FIGS. 1A to 1D show a process to complete the pipe connection of FIG. 1E. These figures are sometimes referred to herein collectively as FIG. 1.

FIGS. 2A and 2B show a process to construct the factory end of the pipe.

DETAILED DESCRIPTION

Figure 1A:
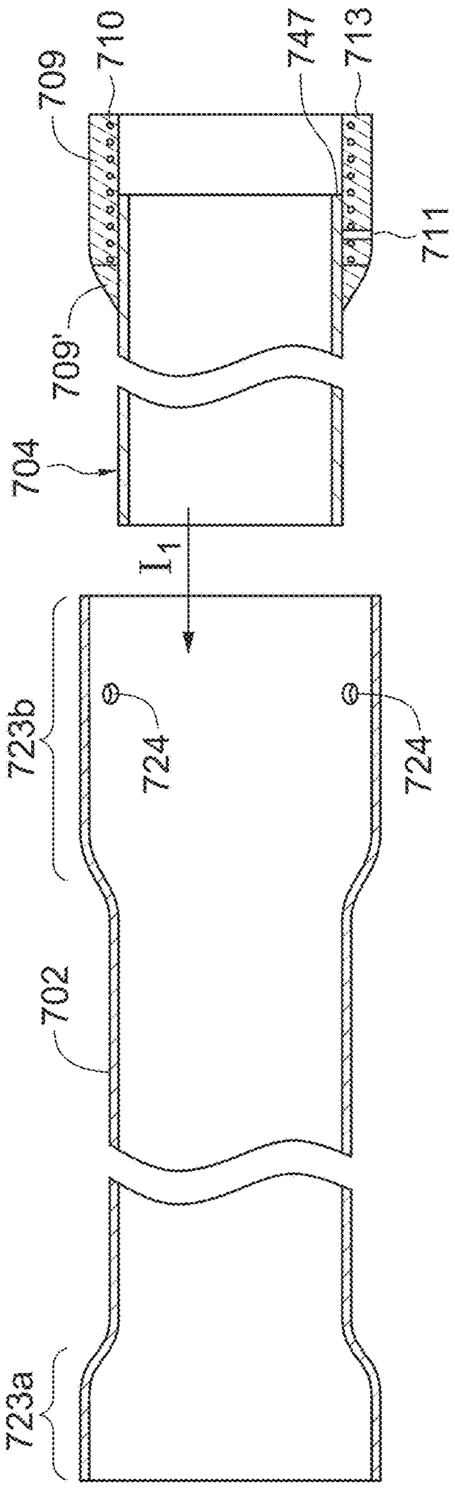
FIGS. 1A to 1E are sectional views of a pipe connection, where

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Applicant's technology described in U.S. Pat. Nos. 9,857,003 and 10,544,889 included embodiments applicable to lined pipe.

Proven Technology

A pipe connection is shown in FIGS. 1A to 1E that incorporates applicant's proven technologies. This pipe connection employs plastic deformation to provide engagement between two pipes 706, 706*a* and a mandrel 708.

In this embodiment, pipes 706, 706*a* are similar to each other. These pipes are plastic lined metal pipes, each with a first mandrel-receiving end 723*a* and a second mandrel-receiving end 723*b*. When connecting the pipes to form a pipe connection, first mandrel-receiving end 723*a* of a first pipe is connected to second mandrel-receiving end 723*b* of a second pipe via mandrel 708 and press rings 742*a*, 742*b*.

The pipes each include a metal pipe 702 that forms the outer surface of the pipe and an inner plastic liner 704. A coating may be bonded to the outer surface of the metal pipe including over the ends 723*a*, 723*b*. Each pipe has a discrete length defined by the ends.

Mandrel 708 is a metal sleeve with a continuous cylindrical wall. Mandrel 708 is internally positioned and has a length to span between ends 723*a*, 723*b*. Mandrel 708 has outwardly facing teeth 746 and fits within pipe ends 723*a*, 723*b*. The metal pipes 702 are pressed into engagement with teeth 746 of the mandrel to hold the connection together. Thus, ends 723*a*, 723*b* are each sized to accommodate mandrel 708, the inner diameter of ends 723*a*, 723*b* being slightly larger than the major outer diameter across mandrel 708 at its teeth. To avoid a constriction in the inner diameter of the pipe, metal pipe 702 may be expanded at its ends to accommodate the mandrel. In this illustrated embodiment, for example, metal pipe 702 is expanded at each end to form bell ends that have an inner diameter IDe larger than the normal inner diameter of the pipe. In this embodiment, the ends do not accommodate equal lengths of the mandrel and thus one bell end, the one on end 723*a* is shorter than the bell end on end 723*b*. In one embodiment, the metal pipe may be expanded at the factory, as by plastic deformation using a swage. Press ring 742*a* for end 723*a* may be installed on the pipe between ends 723*a*, 723*b* before expansion of the metal pipe. Press ring 742*b* can be installed by insertion over open end at end 723*b*, and so need not be installed ahead of time on pipe 706.

Plastic liner 704 lines metal pipe 702. At end 723*a*, liner 704 extends beyond the end of pipe 702 and forms an extension 721. At the other end 723*b*, liner 704 supports an electro-fusion assembly. At this end, liner 704 defines a plastic mandrel sleeve portion 709 formed as a tube and including an inner surface defining an inner diameter, an outer surface and a wall thickness between the inner surface and the outer surface, an electrical conductor 710 on the wall thickness and extending about a circumference of the sleeve and a pair of contacts exposed on the outer surface of pipe 702 and electrically in contact with the electrical conductor 710 for connecting it to an electrical power source. Holes 724 may be formed in metal pipe 702 to allow access to the contacts.

One end of the plastic mandrel sleeve portion 709 is joined to the plastic liner 704 and the other end of the plastic mandrel sleeve 709 is open. Liner 704 and sleeve 709 may be formed integral. In another embodiment of the invention, the plastic pipe sleeve 709 is fastened to the plastic liner 704 by fusion such as by electro-fusion, socket or butt fusion performed at the factory. If electro-fusion is employed, contacts 711 are installed or reconfigured after use to be flush with or recessed into outer surface of liner 704 so that they don't restrict the insertion of liner 704 into metal pipe 702. Also, if electro-fusion is employed to connect sleeve 709 to liner 704, a dual zone conductor may be required. For example, one conductor with contacts is required for the electro-fusion to connect the sleeve to the liner and another assembly of conductor and contacts is required to connect the field inserted liner to the sleeve.

If initially separate, liner 704 and sleeve 709 may be connected before or after installation into metal pipe 702. In this embodiment, liner 704 and sleeve 709 are fused before insertion into pipe 702, such that by FIG. 1B, liner 704 and sleeve 709 are fused together at their interface.

Because the extension 721 at the other end of the pipe is intended to fit into the sleeve of the mandrel end, the diameter across sleeve portion 709 may not be less than the outer diameter across liner extension 721. Thus, a diameter transition 747 such as a step may be present between the normal inner diameter of liner 704 and the inner diameter of sleeve 709. In addition, sleeve portion 709 may accommodate a portion of the bell to ensure that the diameter across the sleeve is sufficient to avoid a constriction in the inner diameter through liner 704. The plastic material of liner 704 may taper at an end 709' of sleeve 709 to follow the transitional contour of the enlargement at end 723*b*. End 709' may be integral with liner 704 or the sleeve portion 709 thereof or may be a separate component. End 709' acts as a filler to support liner 704 through the transitional region and avoid ballooning into a gap when the liner is pressurized, which could cause a failure.

Sleeve 709 is recessed from the edge of end 723*b* and an extension 712 of metal pipe 702 extends beyond the sleeve. A shoulder 713 is formed at the end of sleeve 709 where the inner diameter is reduced from extension 712 to sleeve 709.

To construct a pipe with an integral connection, plastic liner 704 including sleeve 709 may be installed, arrow $I_1$ (FIG. 1A), in metal pipe 702. This may be conducted in the factory. Liner 704 may be tight in metal pipe. The contacts of the electro-fusion assembly may be aligned with the access holes 724 in the pipe. Since this embodiment may provide a fluid tight seal at the connection, it may be desirable to provide a fluid tight seal in holes 724, between each contact and the pipe 702, to provide secondary containment against release of leaked fluids, if that is of interest.

Figure 1B:
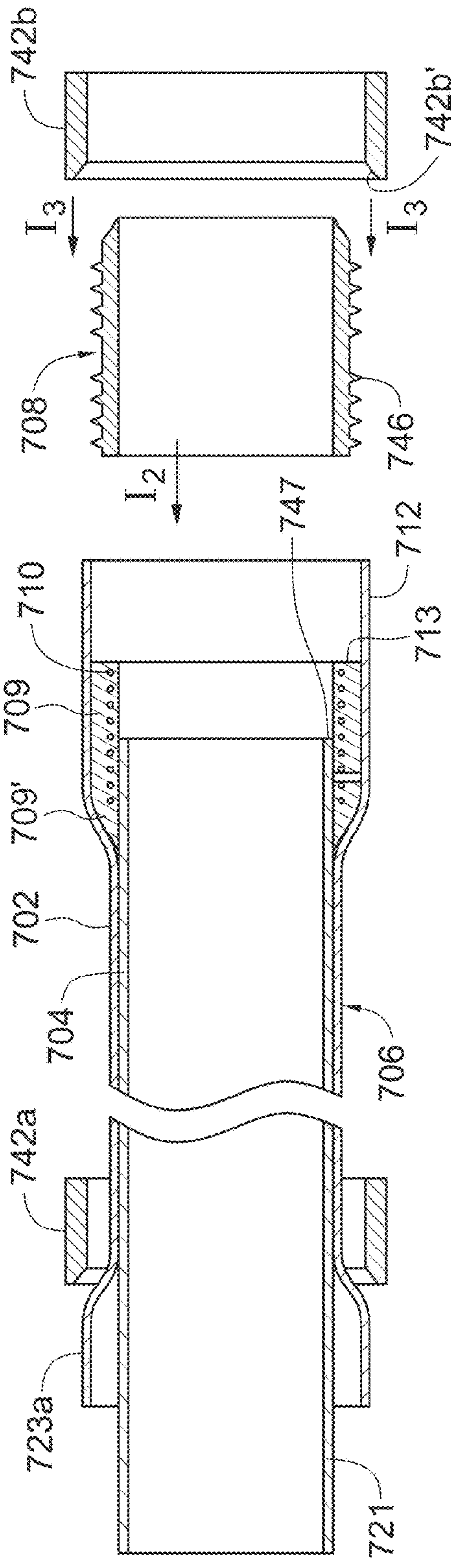

As shown in FIG. 1B, mandrel 708 is inserted, arrow $I_2$, into end 723*b* until it butts against shoulder 713. Mandrel 708 may be formed with a blunt (i.e. substantially non-tapered) end to facilitate butting positioning against sleeve 709 instead of riding thereover or under and to avoid the formation of gaps behind the liner which may cause liner failure when operating at pressurized conditions. When in place, the mandrel is positioned in extension 712 such that end 723*b* encircles it. A portion of the mandrel protrudes out of end 723*b*.

Figure 1C:
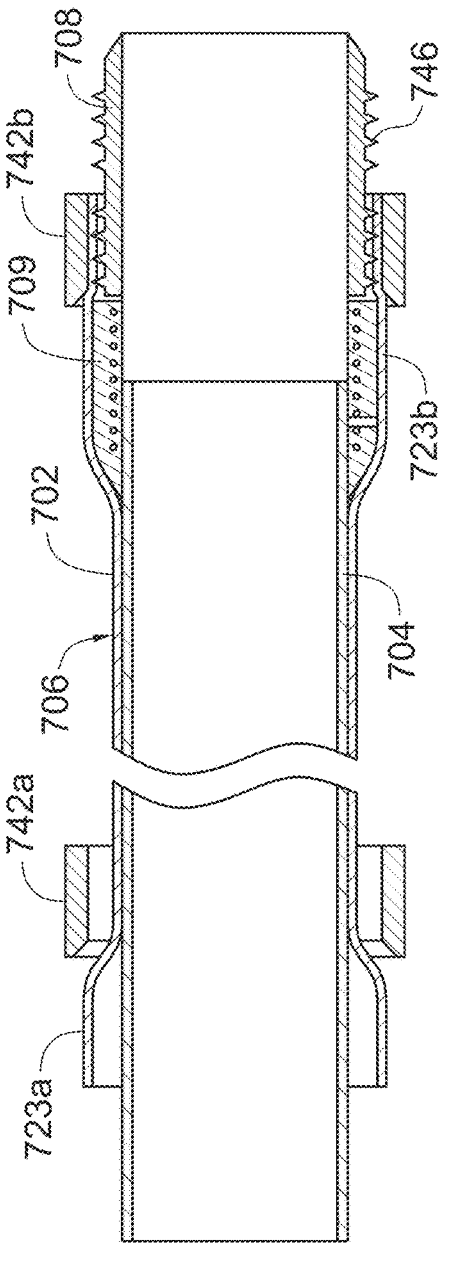

The press ring 742*b* is then pressed over end 723*b*, arrows $I_3$. The inside diameter of press ring 723*b* is smaller than the outside diameter of the expanded section of metal pipe 702 at end 723*b*. A taper 742*b*' on the inside leading edge of the press ring compresses the metal pipe radially inward as the press ring is forced axially over the metal pipe. Buckling should be avoided. Teeth 746 on the outer surface of the mandrel, penetrate and embed into the inner surface of the metal pipe. As shown in FIG. 1C, press ring 742*b* will remain part of the assembly to stiffen and strengthen the attachment by retaining the contact pressure between the metal pipe and the mandrel, to prevent spring back, etc. At this stage, however, press ring 742*a* remains loose on the pipe.

If desired, the above noted process of inserting the mandrel can be carried out in the field. However, it may be useful to assemble the pipe and the mandrel to this stage in the factory, as mandrel 708 can retain the plastic liner including sleeve 709, within the metal pipe even during transport and handling.

To join two sections of plastic lined metal pipe 706, 706*a*, the portion of the mandrel that extends from the long bell end of the pipe is inserted into the expanded metal pipe at end 723*a* of second pipe 706*a*. The mandrel slides into the open annular area between metal pipe 702 and liner 704. At the same time the plastic liner extension 721 is inserted through the inner diameter of mandrel 708 and into the inner diameter of sleeve 709. The relative sizing of extension 721, belled end 723*a* and the protruding length of mandrel are selected such that when mandrel is fully inserted into bell end 723*a*, with the end of mandrel 708 butting against the constriction in metal pipe 702 and/or end of extension 721 butting against shoulder 747, extension 721 is in a position lapping inwardly of conductor 710.

Figure 1D:
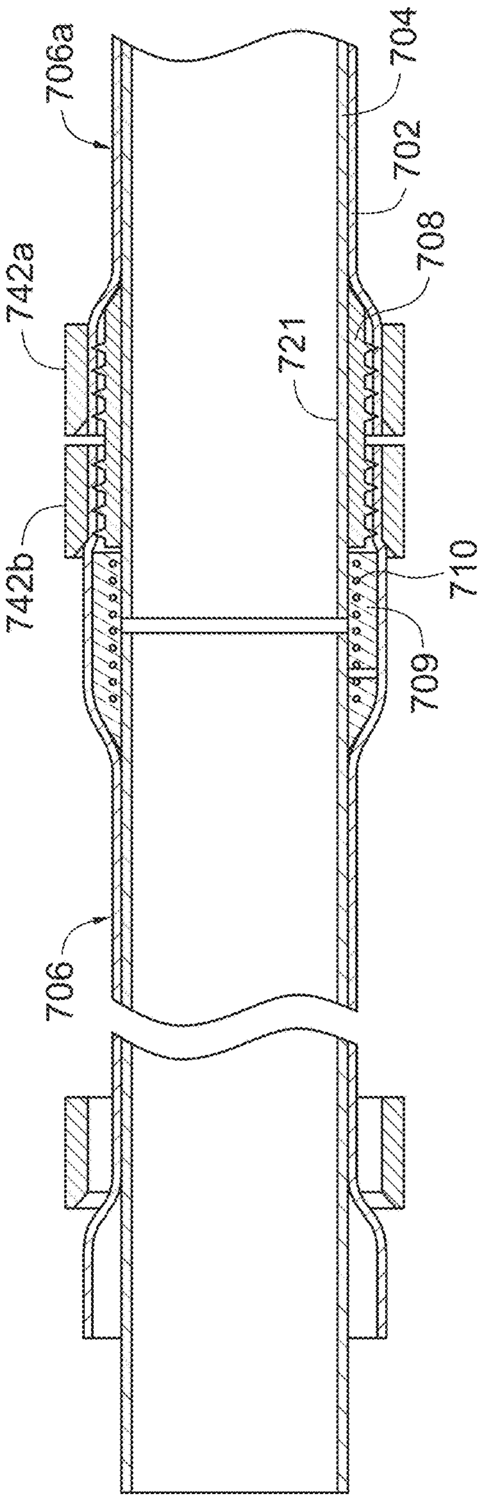
Figure 1E:
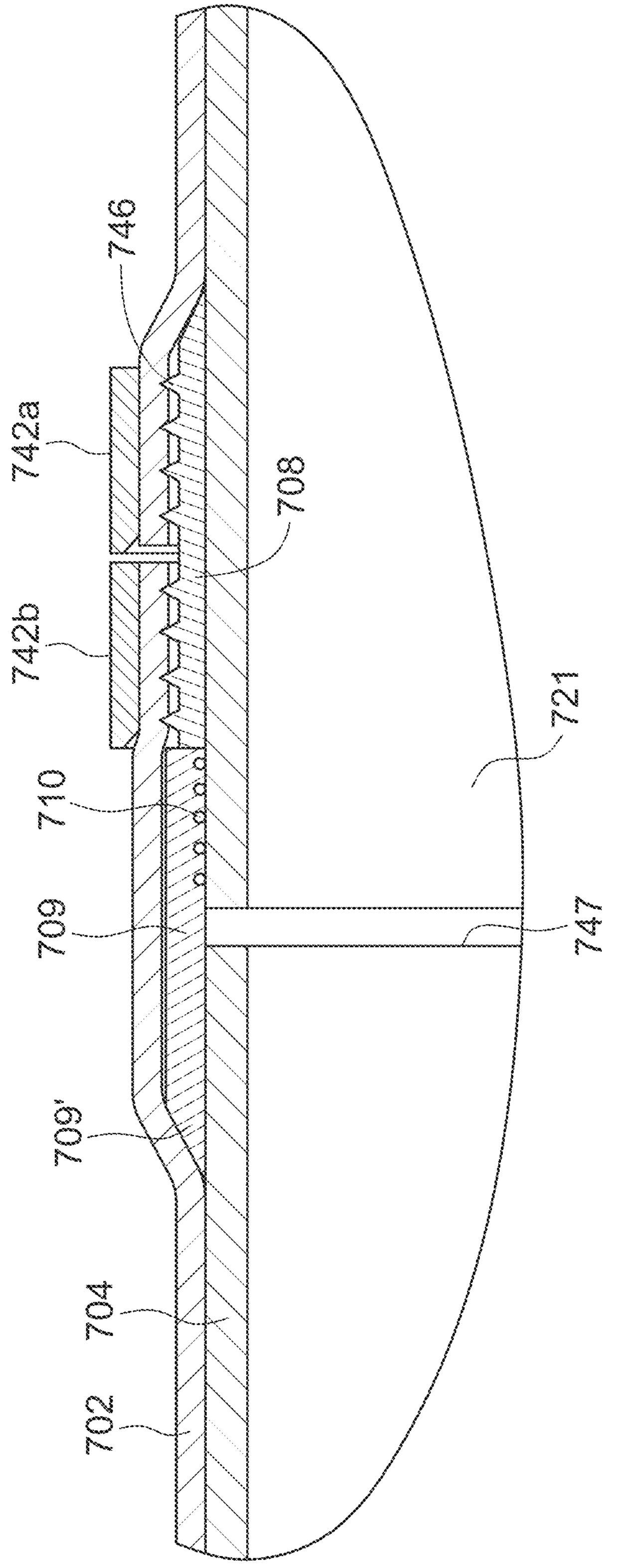

The loose press ring 742*a* of the second pipe 706*a* is pressed over metal pipe 702 at end 723*a*, which attaches mandrel 708 and pipe 702. FIG. 1D shows two pipes connected together according to this method and FIG. 1E shows an enlarged view of the connected ends 723*a*, 723*b*.

The electro-fusion conductor may then be energized to join the plastic liners 704 in the two pipes to form a leak-tight bladder.

New Technology

The ease and reliability of the technology for connecting pipes has led to further research to employ the proven technology and to obtain a stronger pipe to pipe connection.

The pipeline, the pipe connection and the method each employ a length of metal pipe. In one embodiment, the metal pipe includes a metal shell with a plastic liner and the plastic liner contains fluids being conveyed. The pipe connections have an outer metal shell and a plastic liner within the outer metal shell. The liner behaves as a bladder within the metal shell.

A pipeline may be constructed by joining multiple sections of the metal pipe with a connection between the metal of adjacent pipes and a sealed connection between the liners of adjacent pipes.

The plastic liner need not carry any of the structural loading associated with containing a pressurized fluid, since the metal shell of the pipe and the metal-to-metal connection between pipes serves that purpose. The liners of connected pipes are connected directly or indirectly to form a reliable seal to cause the liners to act as a fluid containment bladder.

The pipe connection has been reconfigured by one or more ways to provide an even stronger pipe to pipe connection, as follows: a) a new approach to the use of press rings and b) a new tooth design.

Press Rings

In the new technology, press ring 742*a* is installed in a different manner than was described in applicant's prior U.S. Pat. Nos. 9,857,003 and 10,544,889. The press ring and the pipe are configured to accommodate the new method of installation.

Figure 2A:
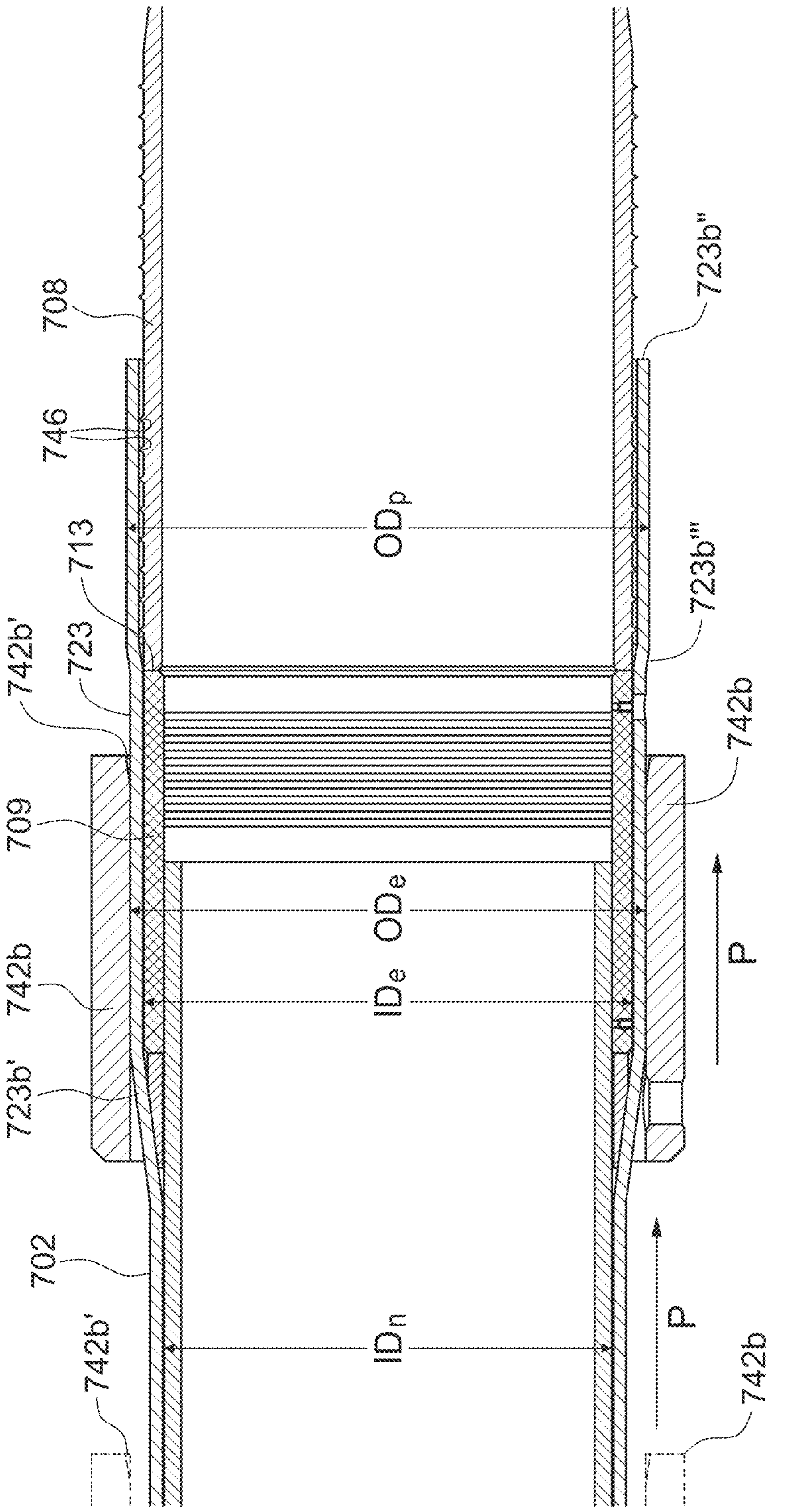
FIGS. 2A and 2B are sectional views of a factory end of a pipe useful in a pipe connection, where

Previously, as shown in FIG. 1B, press ring 742*b* was installed by insertion over open end of end 723*b*. With reference to FIG. 2A, in this new method, press ring 742*b* is installed over end 723*b* by pressing along direction P. This means that the press ring 742*b* is pressed from a position encircling the pipe body diameter IDn, past shoulder 723*b*' and toward the open end 723*b*" of end 723*b*.

Press rings 742*a*, 742*b* are both installed on the pipe 706 between the open ends of the pipe before expansion of the ends to create the belled ends 723*a*, 723*b*. Thus, prior to connection to another pipe, metal pipe 702 has ends formed as bell ends 723*a*, 723*b* and both the press rings loosely encircle the pipe between those ends. The press rings cannot fall off the pipe because their inner diameters are each less than the outer diameter of at least a portion of the pipe's respective bell end. Press rings 742*a*, 742*b* are installed on pipe 702 such that their tapered inner diameters are on their annular ends closest to the bell end over which that press ring is to be secured. To be clear, the tapered inner diameter of each press ring is not on the annular end adjacent the other ring. In particular, press ring 742*b* has a tapering inner diameter 742*b*' on one of its annular ends. The press ring is installed on the pipe with that chamfered end 742*b*' positioned adjacent bell end 723*b*, which is the bell end over which ring 742*b* is to be pressed.

Metal pipe 702 is further configured to accept press installation of press ring 742*b* along direction P. In addition to the expansion of end 723*b* from IDn to IDe, wall of pipe 702 may be further expanded to have an outer diameter ODp larger than the outer diameter ODe (i.e. the outer diameter at the expanded inner diameter IDe). In particular, to permit installation of press ring in a direction P, end 723*b* includes an area adjacent open end 723" where the wall is further expanded to have an outer diameter ODp larger than the outer diameter ODe. Therefore, the pipe has a shoulder 723*b*' where the outer diameter is enlarged to construct bell end 723*b* and a further shoulder 723*b*''' that is a radial, enlargement in the outer diameter along the end 723*b* between shoulder 723*b*' and open end 723*b*". As such, the portion of metal pipe 702 at end 723*b* between shoulder 723*b*''' and open end 723*b*" has an outer diameter ODp. Shoulder 723*b*''' is located radially outwardly of the shoulder 713 of sleeve 709 so that the mandrel 708, when inserted in end 723*b* resides within the area of ODp.

Press ring 742*b* is selected to have an inner diameter larger than ODe but smaller than ODp.

Compared to the method noted above with respect to FIG. 1, in this new method, after mandrel 708 is inserted into end 723*b*, press ring 742*b* is then pressed (arrow P) from its original position (shown in phantom) around the normal diameter IDn of pipe 702 toward open end 723*b*". As shown in FIG. 2A, press ring 742*b* is moved from area of IDn, past shoulder 723*b*', over area of IDe, and toward shoulder 723*b*''' (arrow P).

Because the inside diameter of press ring 723*b* is smaller than the outside diameter of the expanded section ODp at end 723*b*, when press ring 742*b* reaches shoulder 723*b*''', taper 742*b*' on the inside leading edge of the press ring compresses the metal pipe radially inward as the press ring is forced axially over area ODp of metal pipe. This causes teeth 746 on the outer surface of the mandrel to penetrate and embed into the inner surface of the metal pipe.

The sizing of ODp is an important dimension because the interference between it and the ID of the press ring establishes the appropriate amount of tooth embedment. So once ODp and the press ring ID are established, ODe is ideally designed with a slight clearance or size on size fit compared to the ID of the press ring. The difference between ODp and ODe is typically 2-4 mm. It is difficult to consistently achieve a size on size fit between ODe and the press ring because the pipe wall thickness has a relatively large tolerance and is often not round.

Figure 2B:
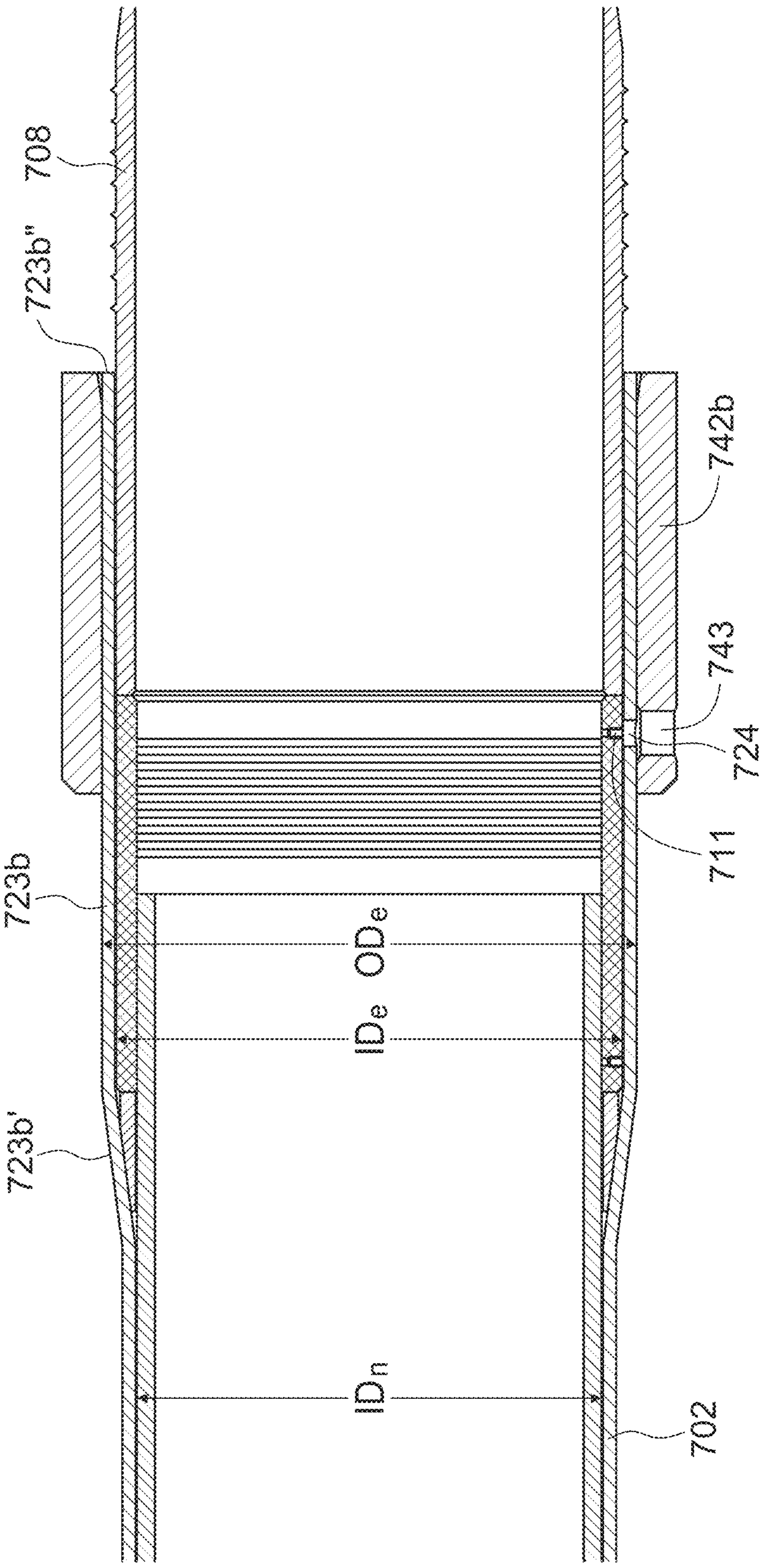

As shown in FIG. 2B, once press ring 742*b* is installed over the area of wall between shoulder 723*b*''' and end 723*b*", the press ring is in place. Press ring 742*b* will remain part of the assembly to stiffen and strengthen the attachment by retaining the contact pressure between the metal pipe and the mandrel, to prevent spring back, etc.

As noted, generally the mandrel is secured in the pipe in the factory. So, this assembly of pipe end 723*b* and mandrel 708 is termed the factory end.

This stepped bell, with two shoulders 723*b*' and 723*b*''' accommodates the electrofusion assembly and the mandrel and enables press ring 742*b* to be pulled over the first portion of the factory bell between 723*b*' and 723*b*''' with a slight clearance. Then, at and after shoulder 723*b*''', the press ring 742*b* engages and compresses inwardly the pipe into the mandrel teeth. The ring engagement direction, arrow P, is from the pipe side rather than from the mandrel side (aka the open end of the pipe bell).

The hole 724 to the contact 711 of electrofusion assembly may be on the bell portion ODe. As such, the compression of the pipe wall by press ring 742*b* does not directly compress the pipe wall around hole 724. This avoids problems where the seal around hole 724 is compromised.

Press ring 742*b* may include a port 743 extending therethrough. Port 743 permits access to hole 724 when the press ring is pressed in place on bell end 723*b*. The port 743 has a diameter larger than the size of hole 724. For example, port 743 may have a diameter that is 1.5 to 3 times the size of the diameter of hole 724.

There are a few advantages to this new press ring press direction toward open end and stepped bell end arrangement. For example, the pipe connection has a high strength due to the direction, arrow P, that the ring is moved when embedding the teeth 746 into the pipe wall. The direction P is opposed to the direction of the primary tensile loading in service.

Also, ring 742*b* is less likely to move during field operations. For example, in field operations, a field press that pulls the press ring 742*a*, sometimes called the "field ring", onto the fitting during pipeline construction uses the press ring 742*b*, sometimes called the "factory ring", as an anchor for the operation. It is beneficial to use the ring 742*b* as an anchor for the field press over anchoring to the pipe, since anchoring the press to the pipe may lead to damage of the pipe's external coating requiring it be repaired to maintain integrity of the corrosion protection. So in the prior system, sometimes the forces required to pull the "field ring" 742*a* into position could dislodge or move the factory ring because the forces are in the reverse direction than the forces used to install the factory ring. This embodiment is stronger because the force to dislodge the ring would have to be much greater since press ring 742*b* would have to be pushed further over the pipe to be dislodged.

New Tooth Design

Teeth 746 have a profile, which is the cross sectional shape therethrough. While various configurations for teeth 746 were disclosed in applicant's prior patents, continued research has determined that certain teeth configurations result in a stronger pipe to mandrel connection, as shown in FIG. 3.

Figure 3:
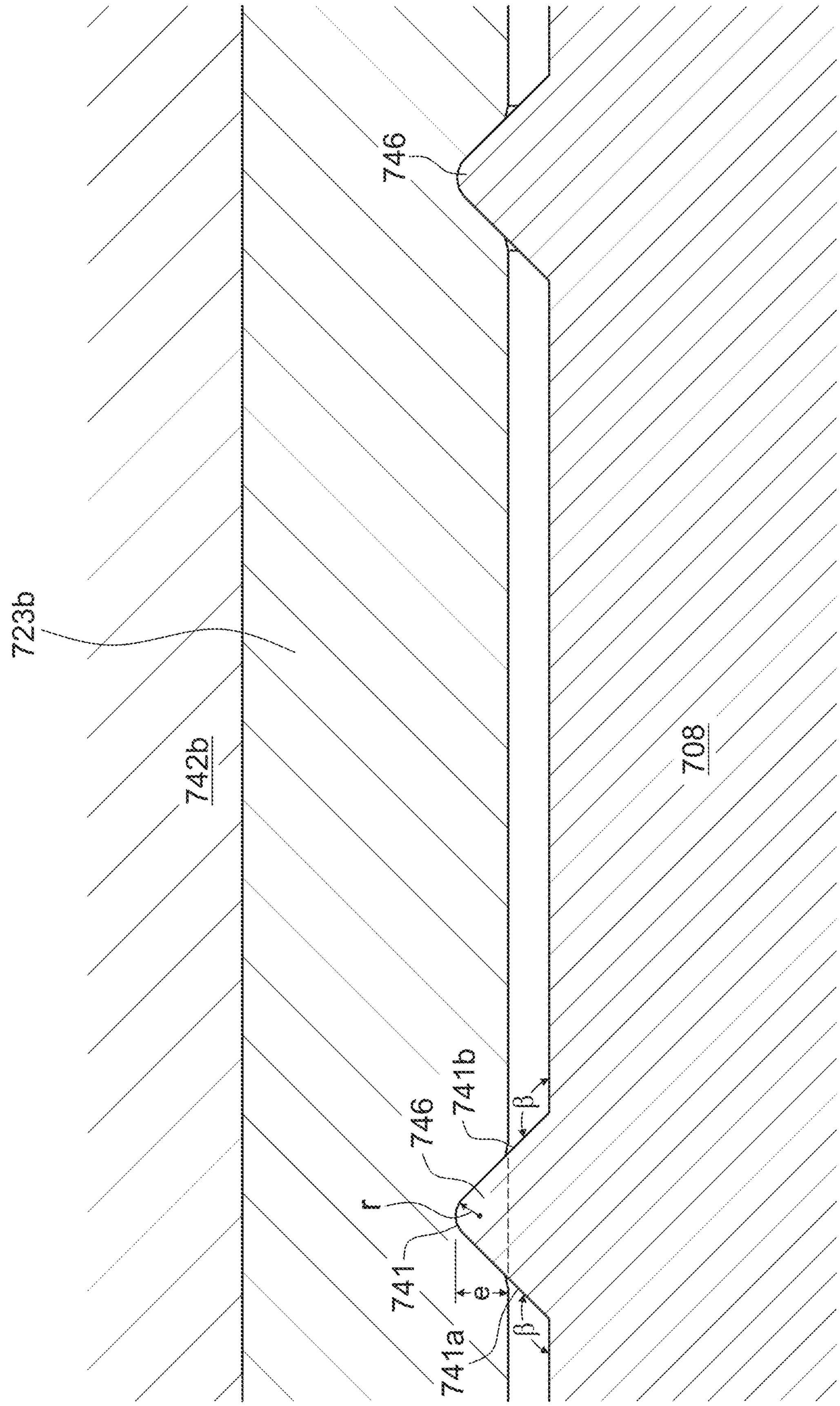
FIG. 3 is an enlarged sectional view of an outer surface of the mandrel.

While FIG. 3 illustrates the teeth in engagement with end 723*b*, the following applies also to the teeth that would be in engagement with end 723*a*.

Each tooth has a geometry including a tooth angle, a shape and a tip shaping. Tooth angle which is the angle at which the first side flank 741*a* and the second side flank 741*b* meet at the tip 741. In one embodiment, the tooth angle is about 90 to 100° such as approximately 90 to 95°.

The illustrated teeth are also symmetrically formed wherein the first side flank 741*a* and the second side flank 741*b* angle away from the tip 741 toward the valleys between the teeth at approximately the same angle. For example, in the illustrated embodiment the first side flank 741*a* and the second side flank 741*a* are each substantially about +/−30 to 60° from an orthogonal reference extending radially from the long axis x of the mandrel. Stated another way, the each of the tooth faces may extend at angle β of 120 to 150° from the long axis of the mandrel 708 on which the tooth is formed.

The illustrated teeth 746 from FIG. 3 also have a single, radiused tip 741. A radiused tip has been found to provide greater embedment depth e and therefore strength against pull force than either a blunt tooth or a sharp tooth.

The embedment depth is critical to achieving the required strength for the joint strength. The shear plane through the tooth (FIG. 3) should be as large as possible to improve strength. The shear plane size is dependent on the tooth geometry (tooth angle) and embedment depth.

The embedment depth is constrained by:

the amount of press force that can be transferred to the tooth embedment through the installation of the press ring without galling the surfaces between the press ring 742 and the pipe 744 or without exceeding practical limitations of machinery size and horsepower.

stress concentrations and localized hardening of materials at the tooth tip that can modify metallurgy to the point that it no longer complies with pipeline material regulations or adversely impacts the materials resistance to crack initiation and propagation. These limitations are extremely important to the safety of pipelines transporting $H_2S$ gas typically found in many oil and gas applications.

Relative hardness of the pipe and mandrel materials.

Design of the tooth tip 741 radius and tooth angle at the tip are important for achieving the desired embedment depth.

If the radius on the tooth tip is too small, it will intensify the surface pressure during embedment resulting in excessive deformation, high stress concentrations or localized hardness.

A larger radius on the tooth tip will better distribute the surface pressure and will better transfer the loads into the tooth body.

If the radius on the tooth tip is too large, the forces required to achieve the necessary tooth embedment will be too large.

It has also been observed that a small radius can shear (i.e. cut into) the pipe material damaging the grain structure of the metal and weakening the joint strength.

If the tooth angle is too small, the tooth will not have sufficient strength for the embedment loads and will deform excessively, not achieving the necessary embedment. This tooth geometry requires greater embedment to achieve the necessary shear plane to provide the required pipe joint strength.

If the tooth angle is too large, the forces required to achieve the necessary tooth embedment will be too large.

Therefore, by radiusing the tips of the teeth, the stress concentrations in the pipe wall and mandrel are reduced, which improves joint strength while maintaining material hardness. This is beneficial in various embodiments and especially where fluids being conveyed include a concentration of hydrogen sulfide. The radiusing of the tips also improves grain structure in the pipe wall and avoids shear of grains.

In one embodiment, for a tooth of height 1 mm to 2 mm with a tooth angle of 90°, the radius r of tip 741 may be 0.6 mm to 0.35 mm. Testing has demonstrated that tooth radius in this range performs better than a tooth radius of 0.5 mm. Stress analysis has shown that the tooth angle should be 90 to 100 degrees.

Once the embedment depth and tooth strength has been designed, the number of teeth will be selected to achieve the desired joint strength.

The mandrel includes a plurality of teeth spaced axially apart by a pitch, as shown. The number of teeth in a joint is constrained by the spacing of the teeth and the number of teeth that can be fit into a practical fitting length. The spacing of the teeth is constrained by the amount of force that can be transferred to the tooth embedment through the installation of the press ring. If the spacing is too low the forces required to press the ring over the pipe exceeds constraint (described above as galling and practical limitations of machinery size and horsepower).

While the tooth geometry and radius could be designed to achieve an acceptable tooth embedment for a pipe material with a slightly harder or higher strength than the mandrel and press ring, in one embodiment the tooth material, and likely the material of the entire mandrel, has a yield strength or hardness equal to or greater than the material to be engaged.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A pipe for a pipe connection assembly comprising:

a first open end;

a second open end;

an inner surface defining an inner diameter;

an outer surface;

a wall thickness defined by the distance between the inner surface and the outer surface;

a first belled end adjacent the first open end;

a second belled end adjacent the second open end;

a middle portion between the first belled end and the second belled end, the middle portion having an outer diameter;

wherein the first belled end has a first enlarged outer diameter greater than the outer diameter of the middle portion; and wherein the second belled end includes (i) a second enlarged outer diameter adjacent the middle portion and where the second enlarged outer diameter is greater than the outer diameter of the middle portion and (ii) a third enlarged outer diameter between the second enlarged outer diameter and the open end, where the third enlarged outer diameter is greater than the second enlarged outer diameter;

a first press ring encircling the middle portion adjacent the first belled end, the first press ring having an inside diameter larger than the outer diameter and smaller than the first enlarged outer diameter; and a second press ring encircling the middle portion between the first press ring and the second belled end, the second press ring having an inside diameter larger than the second enlarged outer diameter and smaller than the third enlarged outer diameter.

2. The pipe of claim 1, further comprising a plastic liner formed of a plastic material compatible with electro-fusion, the plastic liner having a length and an inner diameter, wherein the plastic liner is positioned within the pipe.

3. The pipe of claim 2 further comprising an electro-fusion assembly energizable to cause melting of the plastic material to fuse the plastic liner to another plastic structure.

4. The pipe as in claim 1, wherein the second belled end has an enlarged inner diameter greater than the inner diameter along the middle portion and a shoulder where the inner diameter of the middle portion expands to the enlarged inner diameter, and the pipe further comprising:

a plastic liner installed in the pipe, the plastic liner formed of a plastic material compatible with electro-fusion, the plastic liner having a length, an inside diameter and an outer diameter substantially equal to the inner diameter, the plastic liner being positioned within the pipe with an end of the plastic liner extending into the second belled end with an annulus formed between the plastic liner and the second belled end; and an electro-fusion assembly in the annulus adjacent the shoulder, the electro-fusion assembly including: a plastic sleeve coupled to the plastic liner, the plastic sleeve having an extension extending axially beyond the plastic liner with a bore diameter greater than the inside diameter; an electrical conductor supported by the extension of the plastic sleeve; and an electrical contact for conducting electricity to the electrical conductor.

5. The pipe as in claim 4, wherein the second belled end includes a second annular shoulder where the second enlarged outer diameter expands out to the third enlarged outer diameter; and the plastic sleeve includes an annular end at about a same axial location as the second annular shoulder and the third enlarged outer diameter extends axially beyond the annular end of the plastic sleeve.

6. A pipe connection assembly comprising:

a pipe as in claim 1;

a mandrel for mechanically engaging the pipe to another pipe, the mandrel formed as a cylindrical tube and being sized to be positioned within the second belled end and the pipe mandrel including outwardly extending teeth; and, the second press ring being configured to be installed encircling the pipe at the third enlarged outer diameter and radially outwardly of the mandrel and to deform and hold the pipe radially inwardly into engagement with the teeth.

7. The pipe of claim 1 wherein the wall thickness is 0.250 inches or less.

8. The pipe connection assembly of claim 6 wherein the mandrel has an inside diameter substantially equal to or greater than the inner diameter of the middle portion.

9. A method for making up a pipe connection using the pipe connection assembly of claim 6, the method comprising:

inserting the mandrel into the second open end to a position with a first end of the mandrel being within the third enlarged outer diameter and a second end of the mandrel protruding from the second open end;

moving the second press ring from the position encircling the middle portion to a position encircling third enlarged outer diameter, to thereby deform the second belled end radially inwardly into mechanical engagement with the teeth on the mandrel;

leaving the second press ring in place encircling the second belled end to hold the pipe in mechanical engagement with the mandrel; and installing a second pipe on the second end of the mandrel.

10. The method of claim 9 wherein the mandrel includes further outwardly extending teeth on the second end and installing the second pipe on the second end of the mandrel includes deforming a wall of the second pipe into engagement with the further outwardly extending teeth by installing a press ring to encircle the second pipe and to hold the second pipe in engagement with the further outwardly extending teeth.

11. The method of claim 9 further comprising fusing a first plastic liner of the pipe to a second plastic liner of the second pipe.

12. The method of claim 11 wherein fusing includes electro-fusing.

13. The method of claim 9 wherein the pipe connection assembly is limited to employing the pipe of claim 5 and wherein inserting the mandrel into the second open end positions the mandrel within the belled end and butted against the annular end of the plastic sleeve;

wherein installing a second pipe on the second end of the mandrel inserts an end of a plastic liner of the second pipe within the extension of the plastic sleeve;

and the method further comprising:

electro-fusing the plastic liner of the second pipe to the plastic sleeve to form a fluid tight seal therebetween; and installing a press ring to deform a wall of the second pipe into engagement with the mandrel.

14. A pipe connection comprising:

a first pipe according to claim 1;

a second pipe according to claim 1;

a mandrel mechanically engaging the first pipe to the second pipe, wherein the first belled end of the first pipe is engaged to the mandrel and the second belled end of the second pipe is engaged to the mandrel.

* * * * *